United States Patent [19]

Andry

[11] Patent Number: 4,641,732
[45] Date of Patent: Feb. 10, 1987

[54] DAMPING STRUCTURE

[75] Inventor: Gordon J. Andry, Windsor, Canada

[73] Assignee: Fabricated Steel Products, division of Indal Limited, Windsor, Canada

[21] Appl. No.: 726,986

[22] Filed: Apr. 25, 1985

[30] Foreign Application Priority Data

May 1, 1984 [CA] Canada .................................. 453264

[51] Int. Cl.[4] .............................................. F16F 7/10
[52] U.S. Cl. .................................... 188/379; 267/8 D
[58] Field of Search ...................... 188/378, 379, 380; 267/8 R, 8 D, 63 R, 136, 139, 141, 141.1, 153, 182; 52/167; 174/42; 280/758, 759; 248/559, 611, 612, 613; 180/902, 292, 75.2

[56] References Cited

U.S. PATENT DOCUMENTS

| 2,707,032 | 4/1955 | Burton | 188/378 X |
| 2,796,149 | 6/1957 | Wallin | 188/380 |
| 3,602,465 | 8/1971 | Velut | 267/153 X |
| 4,554,403 | 11/1985 | Hearnshaw | 174/42 |

FOREIGN PATENT DOCUMENTS 607399  10/1960  Canada .................................. 267/153

Primary Examiner—George E. A. Halvosa
Assistant Examiner—Robert J. Oberleitner
Attorney, Agent, or Firm—Ivor M. Hughes

[57] ABSTRACT

This invention relates to an adjustable vibration damper for absorbing energy causing vibratory noise in automotive vehicles, and particularly to a damper capable of adjustment to absorb a range of frequency.

3 Claims, 6 Drawing Figures

U.S. Patent Feb. 10, 1987 4,641,732
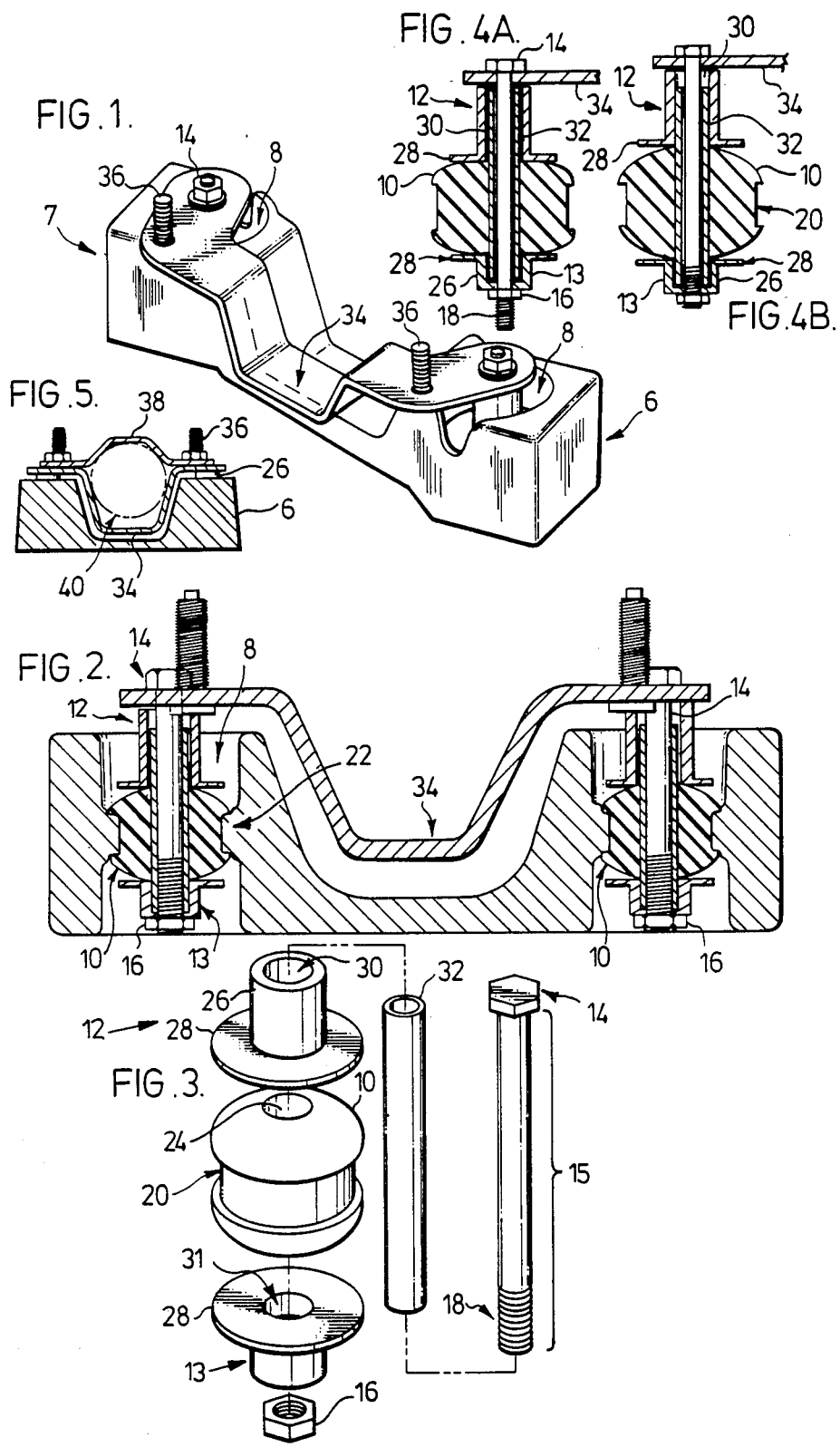

DAMPING STRUCTURE

FIELD OF INVENTION

This invention relates to an adjustable vibration damper for absorbing energy causing vibratory noise in automotive vehicles, and particularly to a damper capable of adjustment to absorb a range of frequency.

BACKGROUND OF INVENTION

A variety of damper constructions employing the use of rubber or other elastomeric material of a constant dynamic spring rate (hereinafter referred to as "k value") to insulate the communication of energy between substantially metallic masses, have been proposed, either for the absorption of vibration in for example, automobiles, trucks and their constituent components, or, for the isolation of vibration which arises in one component from reaching another, in for example the constituent elements of automobiles, trucks, and industrial machinery.

With regard to the former construction of dampers, adapted to absorb vibration, one common structure proposed comprises an inertial mass communicating through rubber or other elastomeric material with a relatively more massive vibrating article. For example, U.S. Pat. No. 2,271,935 relates to means for reducing the energy of a travelling or standing wave occuring in cables in overhead spans where high concentrations of stress and reversals of stress are focused at the ends of the cable comprising points of reflection of the wave. An inertial weight communicating through rubber material with an arm connected to the cable, thereby having its centre of gravity laterally eccentric from the axis of the cable, converts the vertical energy of either travelling or standing waves occuring in the cable into tortional or twisting oscillations with respect to the axis of the cable, which by reason of friction between strands of the cable caused by such twisting thereby dissipates energy along the length of the cable. Further, the rubber material communicating between the inertial weight and the arm connected to the cable resiliently constrains the oscillatory motion of the arm due to the inertia of the weight, thereby dampening the wave energy occuring in the cable.

In another example, U.S. Pat. No. 3,663,002 relates to means for dampening vibration induced body noise in an automobile. An inertial weight, communicating through rubber material with an automobile body at a point rearward of the transmission and over the drive line or propeller shaft, is tuned to vibrate when subjected to a predetermined range of vibrating cycles per second, thereby transferring energy from the automobile body to the inertial weight. The transfer of energy takes place through an insulating connection composed of rubber or other elastomeric material of a constant k value.

Dampers of the type described composed of an inertial mass and an insulating connector which have been proposed in the prior art are only suitable for dampening a specified frequency of vibration and have only minimal effect towards dampening other frequencies to which they are not tuned. This necessitates any manufacturer of automobiles for example, to maintain an inventory of dampers which dampers vibrate at specified frequencies within a specified range.

In each situation, where the vibration may exist over a range of frequencies, individual dampers, each of a different frequency by trial and error must be applied to determine their effectiveness and if unsuitable, removed and returned to inventory. This is particularly so in the case of automobiles where a variety of sources of different frequencies of vibration are present providing interference and omnidirectional vibration. Such sources of vibration may comprise inherent drive live vibrations, gear noise from the differential, an unbalanced drive shaft, transmission gear noise and engine noise, a combination of which sources of vibration may all be magnified through the driveshaft. These same sources of vibration may vary in frequency with vehicle use and climate according to the temperature of such component parts and the temperature of vehicle fluids and lubricants. Additionally, because dampers are constructed in part of elastomeric materials, they do not vibrate at the same frequency under all conditions, and therefore, are not as effective in, for example, winter as in summer.

It is therefore an object of this invention to provide a new vibration damper for absorbing energy causing vibrating noise which overcomes the deficiencies of prior art structures.

Further and other objects of the invention will be realized by those skilled in the art from the following summary, and detailed description of embodiments of the invention.

SUMMARY OF INVENTION

According to one aspect of the invention, an adjustable or variable frequency vibration damper suitable for absorbing energy causing vibrating noise in automotive vehicles or industrial machinery is provided, comprising an inertial weight of a mass suitable to be effective as a tuned energy absorber having at least one suitably placed aperture therethrough to receive a frictionally interfacing mass of readily compressible elastomeric material (in the form of a "disc" or "puck") secured only to the inertial weight and to means for securing the vibration damper to only one vibrating mass, said disc provided with an aperture therethrough, said aperture having an axis substantially concentric to that of the aperture in the inertial mass; the disc bracketed by two cups spaced at opposite ends of the at least one aperture through the inertial weight, each cup substantially comprising an annular wall carrying a concentric flange at one end thereof proximate the disc and having an aperture therethrough, fastening means communicating through the aligned apertures in the cups and the disc adjustably securing the cups together to permit the cups to be adjustably moved towards one another compressing the disc, or away from one another decompressing the disc, thereby altering the dynamic spring rate (or "k value") of the disc and thereby altering the effective frequency dampening response of the damper, the weight of the inertial mass being considerably greater than the disc, and, suitable fastening means for mounting the damper to only one vibrating mass whereby the said fastening means communicates between the only one vibrating mass and the disc.

In one embodiment, the fastening means permitting compression or decompression of the disc, comprises a threaded bolt extending through the aligned apertures in the cups and the disc and is threaded into a prevailing torque nut, thus permitting adjustability and relative movement of the cups, spaced by the disc, away from and toward one another by the turning of the threaded bolt, thus decompressing or compressing, respectively, the disc of elastomeric material.

In a further preferred embodiment of the invention, the inertial weight, of a mass suitable to be effective as a tuned energy absorber, has two suitably placed spaced apart apertures therethrough to receive two frictionally interfacing masses of readily compressible elastomeric material (or "discs"), one disc in each aperture, and, the fastening means for mounting the damper to only one vibrating mass (for example the pinion nose of a cast differential housing) whereby the said fastening means communicates between the only one vibrating mass (for example, the pinion nose) and the two frictionally interfacing discs, comprises two spaced masses (preferably horizontally spaced) of material (preferably steel or iron) spaced by the only one vibrating mass, comprising a first horizontal mass extending between the two spaced apart apertures in the inertial weight carrying the two frictionally interfacing discs, the first horizontal mass connected to the discs by means of at least two spaced apertures therethrough aligned and communicating with the threaded bolts extending through the aligned apertures in the cups bracketing the discs, the said first horizontal mass carrying a further at least two spaced apart apertures to receive threaded bolts aligned and communicating with apertures in the second horizontal mass spaced from the first horizontal mass, thereby permitting the two spaced masses to bracket the only one vibrating mass. While this disposition of the fastening means for mounting the damper to only one vibrating mass is preferable, it is only necessary that the fastening means communicates only between the vibrating mass and the two discs of elastomeric material without contacting the inertial weight. However, the invention does require that the cups be adjustably moveable towards and away from one another to compress and decompress the disc of elastomeric material between the cups since the effective frequency dampening response of the damper varies according to the square root of the quotient formed by the mass of the inertial weight divided by the "k value" of the disc. Where conditions cause the frequency of the damper to change, a quick alteration of the frequency is accomplished by altering the spacing between the cups as for example, by loosening or tightening the threaded bolts into prevailing torque nuts according to a range of adjustments determined by the extent of the treads along the shaft of the threaded bolts.

Preferably, in one embodiment of the invention, the inertial mass is of a weight equal to 1.35 pounds (0.615 kg.); the discs of readily compressible material 0.024 pounds each (0.011 kg.); the two spaced brackets 1.212 pounds (0.550 kg.); and the four bolts each 0.114 pounds (0.051 kg.).

The invention will now be illustrated with reference to the following drawings of an embodiment of the invention.

BRIEF DESCRIPTION OF THE DRAWINGS

FIG. 1 is a perspective view of an adjustable or variable frequency vibration damper according to an embodiment of the invention.

FIG. 2 is a cross-sectional side view of the damper shown in FIG. 1.

FIG. 3 is an exploded view of part of the damper shown in FIG. 1, comprising fastening means for adjustably compressing or decompressing a mass of readily compressible elastomeric material (disc), and, a view of said mass.

FIG. 4A is a cross-sectional side view of the fastening means shown in FIG. 3, showing a relatively compressed disc.

FIG. 4B is a cross-sectional side view of the fastening means shown in FIG. 3, showing a relatively decompressed disc.

FIG. 5 is a side view of the damper shown in FIG. 1, attached to a vibrating mass according to an embodiment of the invention.

DETAILED DESCRIPTION OF PREFERRED EMBODIMENT OF THE INVENTION

With reference to FIGS. 1 and 2, there is shown an adjustable or variable frequency vibration damper 7 comprising an inertial weight 6 having two apertures 8 therethrough to receive two frictionally interfacing masses of readily compressible elastomeric material or discs 10 bracketed by two cups 12, 13 which may adjustably compress or decompress disc 10 by means of loosening or tightening threaded bolts 14 into prevailing torque nuts 16 according to the range of threads 18 provided along the shaft 15 of bolt 14 (best seen in FIG. 3).

With reference to FIG. 2 and 3, preferably disc 10 carries a circumferential depression 20 corresponding to an annular lip 22 carried by aperture 8 suitable to provide a frictional fit. Disc 10 is provided with an aperture 24 therethrough. Cups 12, 13 substantially comprise an annular wall 26 carrying a concentric flange 28 and are provided with apertures 30, 31. When aperture 8 in inertial weight 6 receives disc 10 bracketed by cups 12, 13, apertures 24, 30, 31 are aligned to receive sleeve 32 which carries bolt 14. Lower bracket 34 carries two spaced apart apertures (not shown) to receive threaded bolt 14.

With reference to FIG. 4A, nut 16 is substantially threaded onto threaded bolt 14, causing cup 13 to rise vertically up shaft 15 of of bolt 14 thereby causing flanges 28 to compress disc 10. Nut 16 causes shaft 32 to slide vertically up in aperture 30 in cup 12 until extent of threads 18 is exhausted or shaft 32 is stopped by lower bracket 34.

With reference to FIG. 4B, nut 16 is substantially extended to limit of threads 18, causing cup 13 to lower vertically down shaft 15 of bolt 14 thereby causing flanges 28 to decompress disc 10. Nut 16 permits shaft 32 to slide vertically down in aperture 30 in cup 12 until expansion of disc 10 is complete.

With reference to FIG. 1 and 5, lower bracket 34 carries apertures (not shown) to receive bolts 36 aligned and communicating with apertures in upper bracket 38. Upper bracket 38 and lower bracket 34 are spaced by and frictionally secured about vibrating mass 40, for example, a pinion nose of a cast differential housing.

Vibrating mass 40 is secured to brackets 34, 38; brackets 34, 38 communicate with inertial weight 6 through discs 10. Circumferential depression 20 in disc 10 abutting annular lip 22 in aperture 8 of weight 6 comprises frictional interface. By tightening or loosening bolt 14, cups 12, 13 compress or decompress disc 10, altering the frequency of the adjustable or variable frequency vibration damper. Damper 7 may be quickly and efficiently adjusted to the required frequency (within limits) to damp the unwanted vibration without resort to another damper. When the conditions of use change (as for example weather and seasonal changes), the frequency of vibration of damper 7 will vary and the damper 7 can be adjusted (within limits) to the necessary frequency without resort to replacement.

As many changes could be made to the construction of the embodiment without departing from the scope of the invention, it is intended that all matter contained herein be interpreted as illustrative of the invention and not in a limiting sense.

The embodiments of the invention in which an exclusive property or privilege is claimed are as follows:

1. A vibration damper suitable for dampening the amplitude of omnidirectional vibration in an automotive drive line having means for adjusting the frequency of vibration for which the vibration damper is effective is provided, comprising an inertial weight of a mass suitable to be effective as a tuned energy absorber having at least one suitably placed bore therethrough to receive a frictionally interfacing disc of readily compressible elastomeric material secured at its circumference only to the walls of the bore and secured to means for securing the vibration damper to only one vibrating mass, said disc of readily compressible elastomeric material provided with an aperture therethrough, said aperture having an axis substantially concentric to that of the bore in the inertial weight; the disc of readily compressible elastomeric material bracketed by two cups spaced at opposite ends of the at least one bore through the inertial weight, each cup substantially comprising an annular wall carrying a concentric flange at one end thereof proximate the disc of readily compressible elastomeric material and having an aperture therethrough, a threaded bolt communicating through the aligned apertures in the cups and the disc of readily compressible elastomeric material and threaded into a prevailing torque nut adjustably securing the cups together to permit the cups to be adjustably moved towards one another compressing the disc of readily compressible elastomeric material and adjustably moved away from one another decompressing the disc of readily compressible elastomeric material, the mass of the inertial weight being considerably greater than the disc of readily compressible elastomeric material; and, suitable fastening means for mounting the damper to only one vibrating mass whereby the said fastening means for mounting the damper to only one vibrating mass communicates between the only one vibrating mass and the disc of readily compressible elastomeric material.

2. The damper of claim 1, wherein the number of bores extending through the inertial weight numbers two, suitably spaced apart, each bore to receive one frictionally interfacing disc of readily compressible elastomeric material.

3. The damper in claim 2, wherein the fastening means for mounting the damper to only one vibrating mass communicates only between the only one vibrating mass and two suitably spaced apart discs of readily compressible elastomeric material frictionally interfacing with the walls of the two bores extending through the inertial weight, the fastening means for mounting the damper comprising a pair of preferably steel or iron brackets comprising a first mass extending between and communicating with the two spaced apart discs of readily compressible elastomeric material, the said first mass spaced from a second mass by the only one vibrating mass, and connected to the said second mass substantially so as to provide a calmp secured about the only one vibrating mass.

* * * * *